US012644775B1

(12) United States Patent
Deng

(10) Patent No.: US 12,644,775 B1
(45) Date of Patent: Jun. 2, 2026

(54) TEMPERATURE MEASUREMENT DEVICE

(71) Applicant: Fanshengda Industrial Development (Shenzhen) Co., Ltd., Shenzhen (CN)

(72) Inventor: JianLi Deng, Shenzhen (CN)

(73) Assignee: Fanshengda Industrial Development (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 19/428,449

(22) Filed: Dec. 22, 2025

(30) Foreign Application Priority Data

Dec. 16, 2025 (CN) .......................... 202511900794.1

(51) Int. Cl.
  *G01K 1/024* (2021.01)
  *G01K 1/08* (2021.01)
(52) U.S. Cl.
  CPC .............. *G01K 1/024* (2013.01); *G01K 1/08* (2013.01)
(58) Field of Classification Search
  CPC ................................. G01K 1/024; G01K 1/08
  USPC ......................................................... 374/208
  See application file for complete search history.

(56) References Cited

U.S. PATENT DOCUMENTS

| | | | | |
|---|---|---|---|---|
| 12,174,075 B1 * | 12/2024 | Wei | .......................... | G01K 1/024 |
| 12,352,632 B1 * | 7/2025 | Wang | .......................... | G01K 1/12 |
| 12,422,306 B1 * | 9/2025 | Zeng | .......................... | G01K 13/00 |
| 2019/0250043 A1 * | 8/2019 | Wu | .......................... | G01K 3/005 |

FOREIGN PATENT DOCUMENTS

| | | | | | |
|---|---|---|---|---|---|
| CN | 215865557 U | * | 2/2022 | | |
| CN | 219977585 U | * | 11/2023 | | |
| CN | 117740196 A | * | 3/2024 | .............. | G01K 1/00 |
| CN | 118565639 A | * | 8/2024 | .............. | H02J 7/751 |
| CN | 120609456 A | * | 9/2025 | .............. | H04Q 9/00 |

* cited by examiner

*Primary Examiner* — Mirellys Jagan
(74) *Attorney, Agent, or Firm* — Ricky Lam

(57) ABSTRACT

The present disclosure provides a temperature measurement device, comprising: a metal housing, the metal housing comprising a first metal portion and a second metal portion, the second metal portion having a tip for inserting into food; an intermediate electrical isolation portion for connecting the first metal portion and the second metal portion, the intermediate electrical isolation portion configured to electrically isolate the first metal portion and the second metal portion when they are connected to the intermediate electrical isolation portion; a circuit board unit at least located within the second metal portion, the circuit board unit being connected to an antenna unit; wherein the first metal portion and the second metal portion respectively serve as electrodes of the temperature measurement device, and the first metal portion serves as part of the antenna unit of the temperature measurement device.

13 Claims, 5 Drawing Sheets

TEMPERATURE MEASUREMENT DEVICE

FIELD

The present disclosure relates to the field of temperature measurement, and more specifically, to a temperature measurement device.

BACKGROUND

Temperature measurement devices can be used to measure real-time temperature of food, such as during the roasting process of a steak, to monitor the cooking process. Due to the small size of temperature measurement devices, conventional ones have issues such as poor high-temperature resistance, low integration, and poor signal quality. The temperature measurement device of the present disclosure uses one portion of the housing as both an electrode and an antenna, improving product integration. Furthermore, in conventional temperature measurement devices, the antenna is placed inside the housing. Since the housing itself has a shielding effect, it can attenuate part of the antenna signal. In the temperature measurement device of the present disclosure, a portion of the housing is directly used as the antenna, reducing the shielding effect and enhancing signal transmission.

SUMMARY

The present disclosure proposes a temperature measurement device that solves problems such as poor high-temperature resistance, low integration, and poor signal quality in conventional temperature measurement devices.

The present disclosure is proposed in view of the above and other considerations.

According to one aspect of the present disclosure, it is provided a temperature measurement device, the temperature measurement device comprises:

a metal housing, the metal housing comprising two portions that respectively electrically isolated and serve as electrodes, one of the two portions being configured as an antenna of the temperature measurement device.

In one embodiment, wherein the metal housing comprises a first metal portion and a second metal portion, the second metal portion having a tip for inserting into food, and the temperature measurement device further comprises:

an intermediate electrical isolation portion for connecting the first metal portion and the second metal portion, the intermediate electrical isolation portion configured to electrically isolate the first metal portion and the second metal portion when they are connected to the intermediate electrical isolation portion; and a circuit board unit at least located within the second metal portion, the circuit board unit being connected to an antenna unit;

wherein the first metal portion and the second metal portion respectively serve as electrodes of the temperature measurement device, and the first metal portion serves as part of the antenna unit of the temperature measurement device.

In one embodiment, wherein the antenna unit comprises a first antenna extending from the circuit board unit towards the first metal portion and connected to the first metal portion, the first antenna and the first metal portion constituting the antenna unit.

In one embodiment, wherein the first antenna comprises an extension body and an abutting body, the extension body being connected to the circuit board unit, the abutting body abutting against an inner wall of the first metal portion.

In one embodiment, wherein the first antenna comprises an extension body and an abutting body, the extension body being connected to the circuit board unit, the abutting body abutting against an inner wall of the first metal portion, the abutting body comprises a first abutting portion, a second abutting portion, and a third abutting portion, which extend along and abut against the inner wall of the first metal portion, the first abutting portion is connected to the extension body, the second abutting portion is connected to the first abutting portion, and an opening is provided between the third abutting portion and the extension body.

In one embodiment, wherein the intermediate electrical isolation portion comprises: a first channel and a second channel penetrating through the intermediate electrical isolation portion.

In one embodiment, wherein a portion of the extension body is located within the second channel.

In one embodiment, wherein the intermediate electrical isolation portion further comprises: a first groove provided along an outer wall of the intermediate electrical isolation portion, the abutting body being located within the first groove and matching the first groove, in such a manner that a side of the abutting body facing the inner wall of the first metal portion protrudes from the first groove.

In one embodiment, wherein the circuit board unit comprises a circuit board fixing end, the circuit board fixing end being accommodated within the first channel.

In one embodiment, wherein the temperature measurement device further comprises an ambient temperature sensor and a food temperature sensor, the ambient temperature sensor extending from the circuit board unit through the first channel towards the first metal portion.

In one embodiment, wherein the second abutting portion extends in an axial direction of the first metal portion at a distance away from the first abutting portion and the third abutting portion, the first abutting portion and the third abutting portion define an annular structure extending in a circumferential direction of the first metal portion, and the second abutting portion abuts the first metal portion in the axial direction of the first metal portion.

In one embodiment, wherein a contact surface between the abutting body and the inner wall of the first metal portion constitutes a signal transmission channel, when a signal is transmitted to the first metal portion, the first metal portion transmits the signal radially outwards.

In one embodiment, wherein the intermediate electrical isolation portion comprises: an intermediate protrusion, when the first metal portion and the second metal portion are connected to the intermediate electrical isolation portion, the intermediate protrusion separates the first metal portion and the second metal portion.

In one embodiment, wherein when the first metal portion and the second metal portion are connected to the intermediate electrical isolation portion, the intermediate protrusion serves as an indication line of the temperature measurement device, the portion from the indication line to the tip is inserted into food, and the portion from the indication line to a handle is exposed to high-temperature air.

In one embodiment, wherein the first groove is provided at a connection end between the intermediate electrical isolation portion and the first metal portion.

In one embodiment, wherein the temperature measurement device further comprises a battery unit connected to the circuit board unit, the circuit board unit comprises an elastic contact unit contacting an inner wall of the second metal portion, the elastic contact unit extends from the circuit board unit to the second metal portion, the first metal portion is connected to the circuit board unit via the first antenna, and the first metal portion and the second metal portion are connected to the battery unit via the first antenna and the elastic contact unit, respectively.

In one embodiment, wherein the intermediate electrical isolation portion further comprises at least two second grooves provided along the outer wall of the intermediate electrical isolation portion, the second grooves are respectively provided at the connection end between the intermediate electrical isolation portion and the first metal portion and a connection end between the intermediate electrical isolation portion and the second metal portion and are used for filling sealing material.

In one embodiment, wherein a handle is connected to the first metal portion.

According to one aspect of the present disclosure, it is provided a temperature measurement device, the temperature measurement device comprises:

a metal housing, the metal housing comprising a first metal portion and a second metal portion, the second metal portion having a tip for inserting into food;

an intermediate electrical isolation portion for connecting the first metal portion and the second metal portion, the intermediate electrical isolation portion configured to electrically isolate the first metal portion and the second metal portion when they are connected to the intermediate electrical isolation portion;

a circuit board unit at least located within the second metal portion, the circuit board unit being connected to a food temperature sensing unit, a battery unit, and a first antenna;

wherein the second metal portion is configured to be one electrode of the temperature measurement device, and the first metal portion and the first antenna are configured to be another electrode and an antenna unit of the temperature measurement device.

A conventional metal housing shields internal circuits and hinders electromagnetic wave transmission. However, the temperature measurement device of the present disclosure uses one portion of the metal cylindrical housing as an efficient radiator (antenna). The basic principle of an antenna is to convert high-frequency alternating current in a circuit into electromagnetic waves for radiation (transmission mode), or to convert electromagnetic waves in space into high-frequency alternating current (reception mode). The efficiency of an antenna is closely related to its size and shape. The circuit board of a food thermometer itself is very small. If only a tiny antenna is connected to the circuit board, its radiation efficiency would be very low, resulting in a very short signal transmission distance. At the same time, if the small antenna is completely enclosed inside the metal housing, the metal acts like a Faraday cage, partially blocking the entry and exit of electromagnetic waves and resulting in poor signal in certain directions. Once the metal housing surface is used as the antenna, it transforms from a passive shield into an active, large-sized monopole antenna, thereby efficiently radiating electromagnetic waves into space.

More embodiments of the present disclosure can also achieve other advantageous technical effects not listed one by one. Some of these other technical effects may be partially described below and are predictable and understandable for those skilled in the art after reading the present disclosure.

BRIEF DESCRIPTION OF DRAWINGS

In order to illustrate the technical solutions in the embodiments of the present disclosure more clearly, the following will briefly introduce the drawings needed for describing the embodiments or the prior art. Obviously, the drawings in the following description are only some embodiments of the present disclosure. For those of ordinary skill in the art, other drawings can be obtained based on these drawings without creative effort.

DETAILED DESCRIPTION

Figure 1:
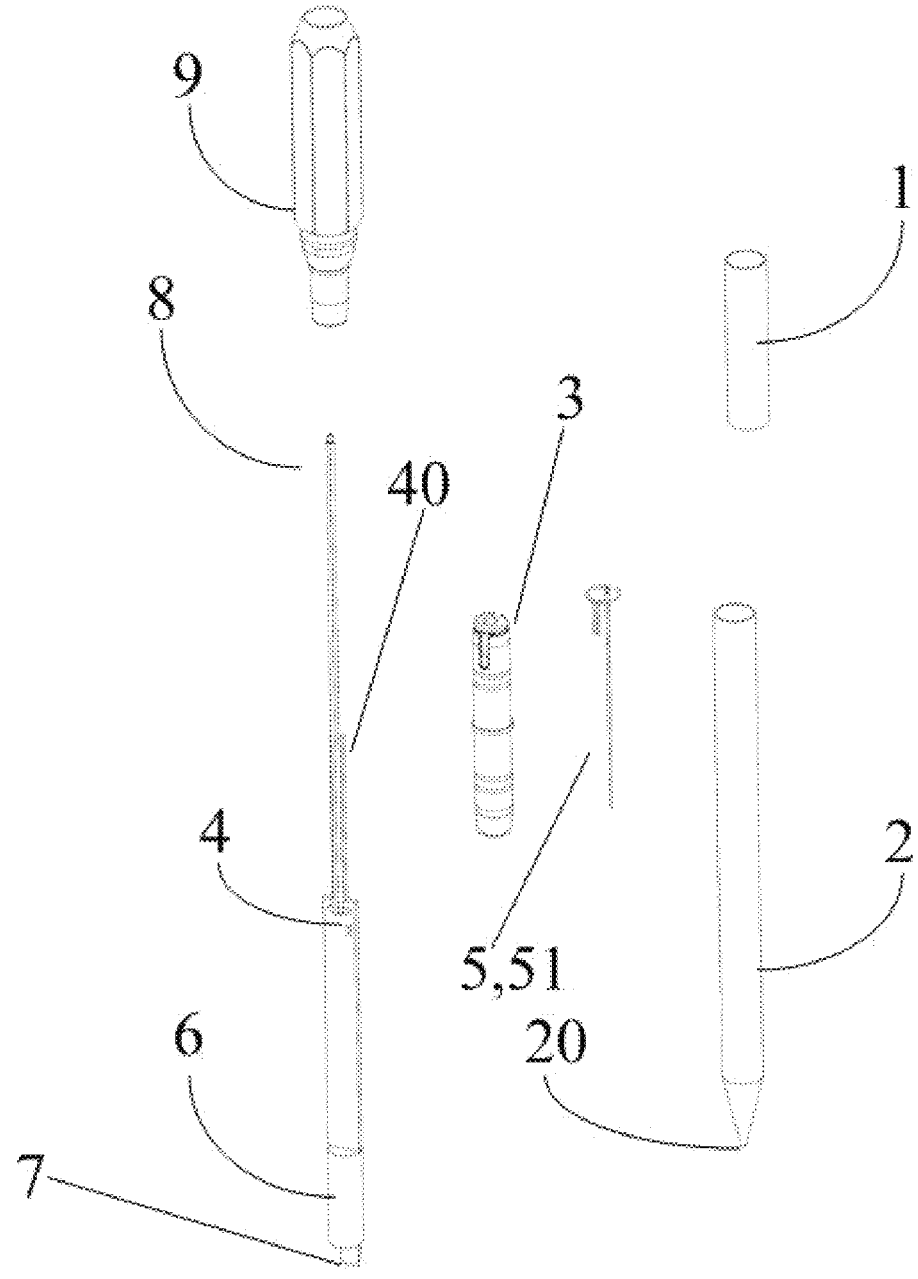
FIG. 1 shows an exploded view of a temperature measurement device of the present disclosure.

In the following description of the drawings and specific embodiments, details of one or more embodiments of the present disclosure will be set forth. From these descriptions, drawings, and claims, other features, objectives, and advantages of the present disclosure will become apparent.

It should be understood that the illustrated and described embodiments are not limited in application to the details of construction and arrangement of components set forth in the following description or illustrated in the drawings. The illustrated embodiments can be other embodiments and can be implemented or executed in various ways. The examples are provided by way of explanation, not limitation, of the disclosed embodiments. Indeed, it will be apparent to those skilled in the art that various modifications and variations can be made to the embodiments of the present disclosure without departing from the scope or spirit of the disclosure. For example, features illustrated or described as part of one embodiment can be used with another embodiment to yield still further embodiments. Therefore, the present disclosure is intended to cover such modifications and variations within the scope of the appended claims and their equivalents.

It should be understood that terms such as "upper", "lower", "front", "rear", "left", "right", "horizontal", etc., indicating orientation or positional relationships are based on the orientation or positional relationships shown in the drawings. They are only for convenience of describing the present disclosure and simplifying the description, and do not indicate or imply that the referred device or element must have a specific orientation, be constructed and operated in a specific orientation, and thus should not be construed as limiting the present disclosure.

Similarly, it is to be understood that the phraseology and terminology used herein is for the purpose of description and should not be regarded as limiting. The use of "including", "comprising", or "having" and variations thereof herein is meant to encompass the items listed thereafter and equivalents thereof as well as additional items.

As used herein, terms "first", "second", etc., are used for descriptive purposes only and are not to be construed as indicating or implying relative importance or implicitly indicating the quantity of the indicated technical features. Thus, features defined with "first", "second", etc., may explicitly or implicitly include one or more of such features. In the present description, "a plurality of" means two or more unless specifically defined otherwise.

As used herein, terms "install", "connect", "join", "fix", etc., should be understood broadly. For example, it can be a fixed connection, a detachable connection, or an integral connection; it can be a mechanical connection, an electrical connection; it can be a direct connection, an indirect connection through an intermediate medium, or internal communication between two elements. For those of ordinary skill in the art, the specific meanings of the above terms in the present disclosure can be understood according to specific circumstances.

Herein, "high temperature" refers to a temperature above 100° C., preferably above 500° C. Herein, "electrical isolation" means electrical insulation.

The present disclosure will be described in more detail below with reference to specific embodiments.

Figure 4:
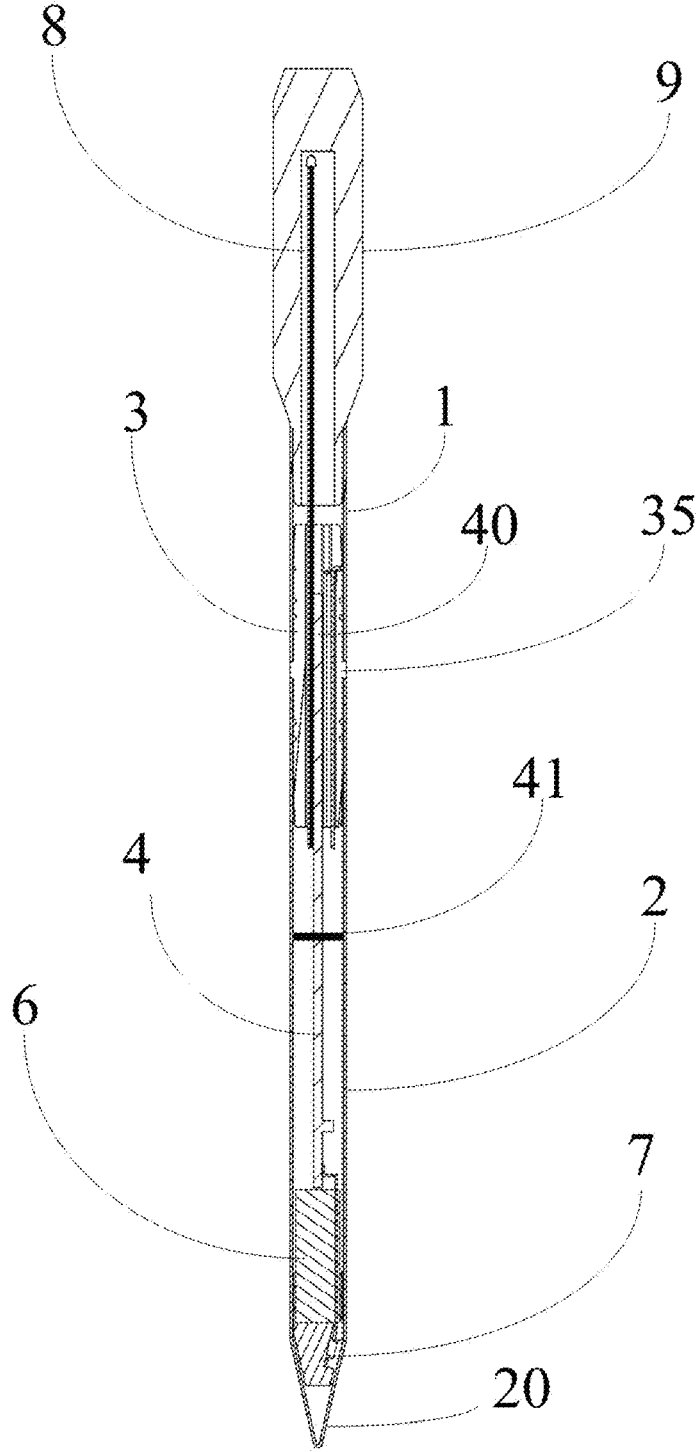
FIG. 4 shows a sectional view of the temperature measurement device of the present disclosure.

FIGS. 1 and 4 show a temperature measurement device. The temperature measurement device is elongated and can be used to measure temperature during high-temperature processing of food. The temperature measurement device comprises: a metal housing, the metal housing comprising two portions that respectively electrically isolated and serve as electrodes, one of the two portions being configured as an antenna of the temperature measurement device. The two portions comprise a first metal portion 1 and a second metal portion 2, the second metal portion 2 having a tip 20 for inserting into food. Since metal material is a good conductor of heat and electricity, using metal material as the housing facilitates rapid heat transfer to a temperature sensor inside the tip 20 and facilitates serving as electrodes for charging the temperature measurement device.

Figure 5:
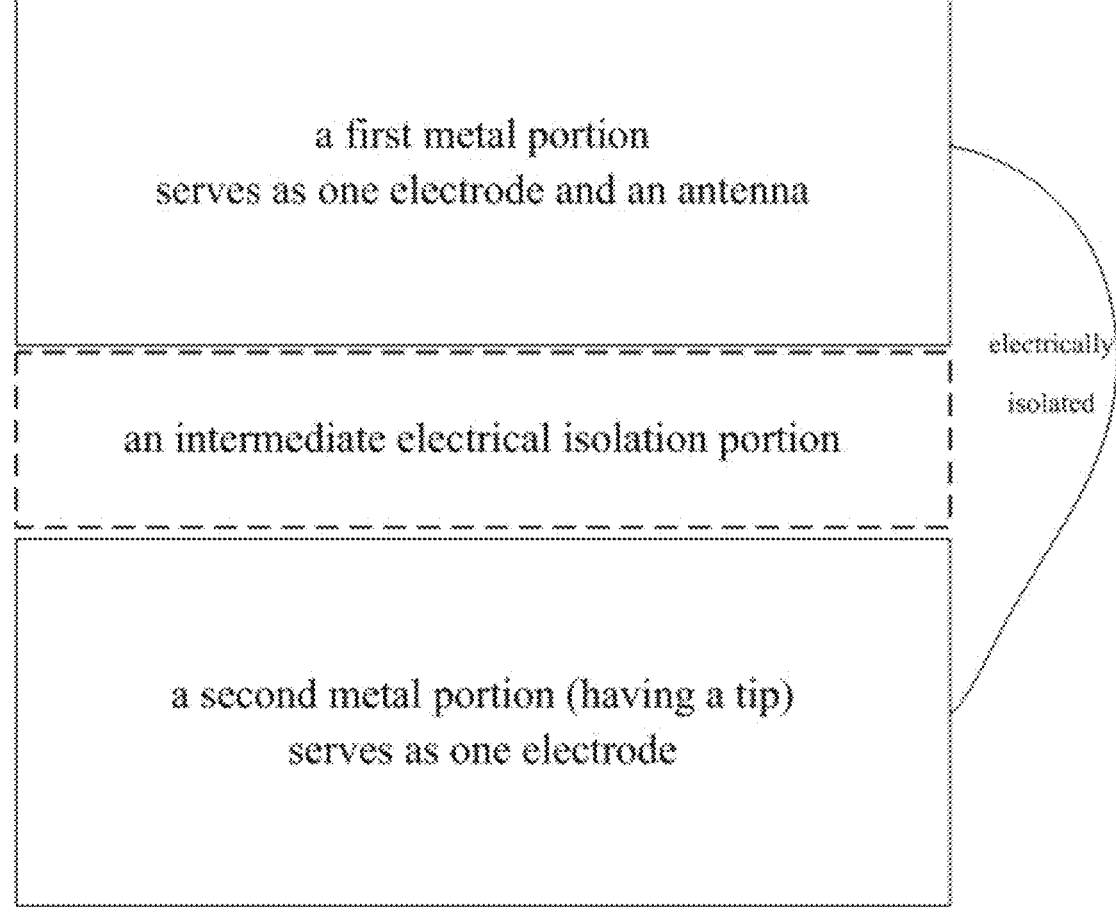
FIG. 5 shows a schematic diagram of the temperature measurement device of the present disclosure.

Furthermore, as shown in FIGS. 1 and 4, the temperature measurement device can further comprise: an intermediate electrical isolation portion 3 for connecting the first metal portion 1 and the second metal portion 2, the intermediate electrical isolation portion 3 configured to electrically isolate the first metal portion 1 and the second metal portion 2 when they are connected to the intermediate electrical isolation portion 3; and a circuit board unit 4 (Printed Circuit Board, PCB) at least located within the second metal portion 2, the circuit board unit 4 being connected to an antenna unit 5, a battery unit 6, a food temperature sensor 7, etc. As shown in FIG. 5, the first metal portion 1 and the second metal portion 2 respectively serve as electrodes of the temperature measurement device, and the first metal portion 1 serves as part of the antenna unit 5 of the temperature measurement device.

Advantageously, as shown in FIG. 5, during charging of the temperature measurement device of the present disclosure, the first metal portion 1 and the second metal portion 2 can be used as positive and negative electrodes of the temperature measurement device, while during measuring food temperature and transmitting/sending signals, the first metal portion 1 exposed outside the food can also be used as an antenna.

As shown in FIGS. 1-4, the antenna unit 5 can comprise a first antenna 51 extending from the circuit board unit 4 towards the first metal portion 1 and connected to the first metal portion 1, the first antenna 51 and the first metal portion 1 constituting the antenna unit 5. The first antenna 51 can comprise an extension body 510 and an abutting body 511 connected to the extension body 510, the extension body 510 being connected to the circuit board unit 4, the abutting body 511 abutting against an inner wall of the first metal portion 1.

Figure 2:
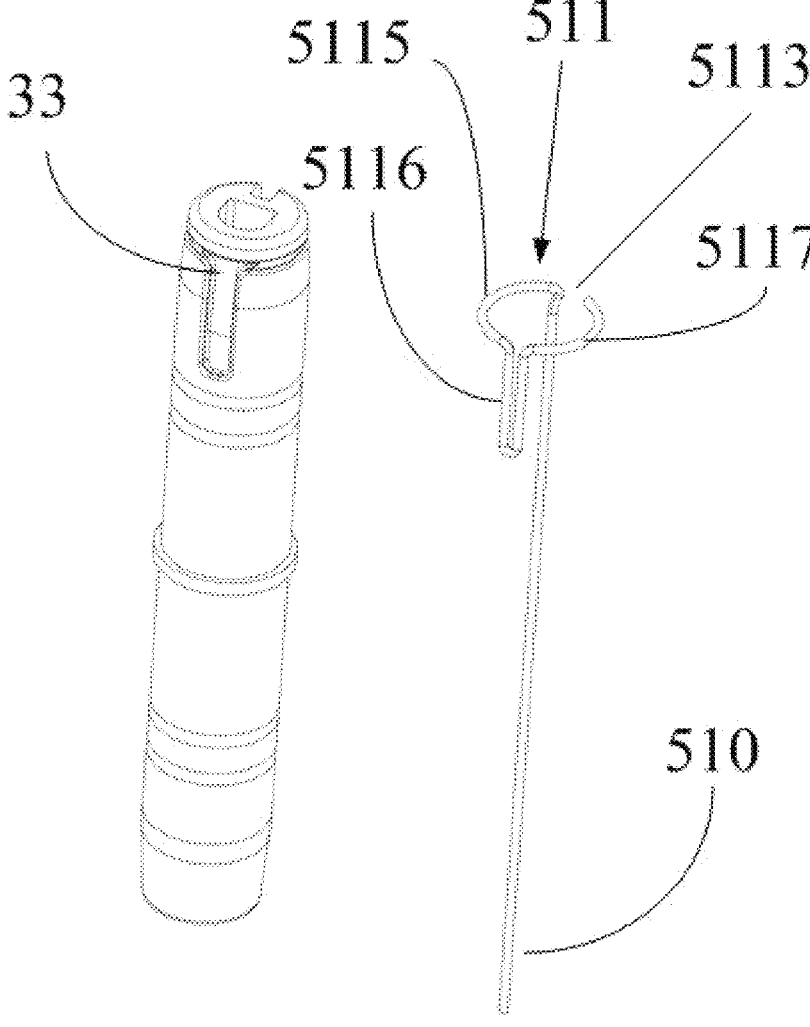
FIG. 2 shows a perspective view of an intermediate electrical isolation portion and a first antenna of the temperature measurement device of the present disclosure.

As shown in FIG. 2, in order to facilitate the installation of the first antenna 51 and ensure its tight abutment against the first metal portion 1 during high temperatures, the first antenna 51 may also be configured as illustrated in FIG. 2. The first antenna 51 may include an extension body 510 and an abutting body 511 connected to the extension body 510. The extension body 510 is connected to the circuit board unit 4, while the abutting body 511 abuts against the inner wall of the first metal portion 1. The abutting body 511 is constructed to include a first abutting portion 5115, a second abutting portion 5116, and a third abutting portion 5117, all of which closely abut against the inner wall of the first metal portion 1. The first abutting portion 5115 is connected to the extension body 510, the second abutting portion 5116 is connected to the first abutting portion 5115, and an opening 5113 is provided between the third abutting portion 5117 and the extension body 510. As shown in FIG. 2, the second abutting portion 5116 extends away from the first abutting portion 5115 along the axial direction of the first metal portion 1. The first abutting portion 5115 and the third abutting portion 5117 collectively form an annular structure, extending along the circumferential direction of the first metal portion 1. The second abutting portion 5116 abuts against the first metal portion 1 in the axial direction. By maintaining abutment with the first metal portion 1 in both the circumferential and axial directions, a tight connection between the first antenna 51 and the first metal portion 1 is ensured during high temperatures, while also improving antenna signal transmission. Of course, the abutting body 511 may also be designed in any configuration that allows it to closely abut against the first metal portion 1.

A contact surface between the abutting body 511 and the inner wall of the first metal portion 1 constitutes a signal transmission channel. When a signal is transmitted to the first metal portion 1, the first metal portion 1 transmits the signal radially outwards. A conventional metal housing shields internal circuits and hinders electromagnetic wave transmission. However, the temperature measurement device of the present disclosure uses the first metal portion 1 as an efficient radiator (antenna). The circuit board of a food thermometer itself is very small. If only a tiny antenna is connected to the circuit board, its radiation efficiency would be very low, resulting in a very short signal transmission distance. At the same time, if the small antenna is completely enclosed inside the metal housing, the metal acts like a Faraday cage, partially blocking the electromagnetic waves and resulting in poor signal in certain directions. Once the metal housing surface is used as the antenna, it transforms from a passive shield into an active, large-sized monopole antenna, thereby efficiently radiating electromagnetic waves into space.

Figure 3:
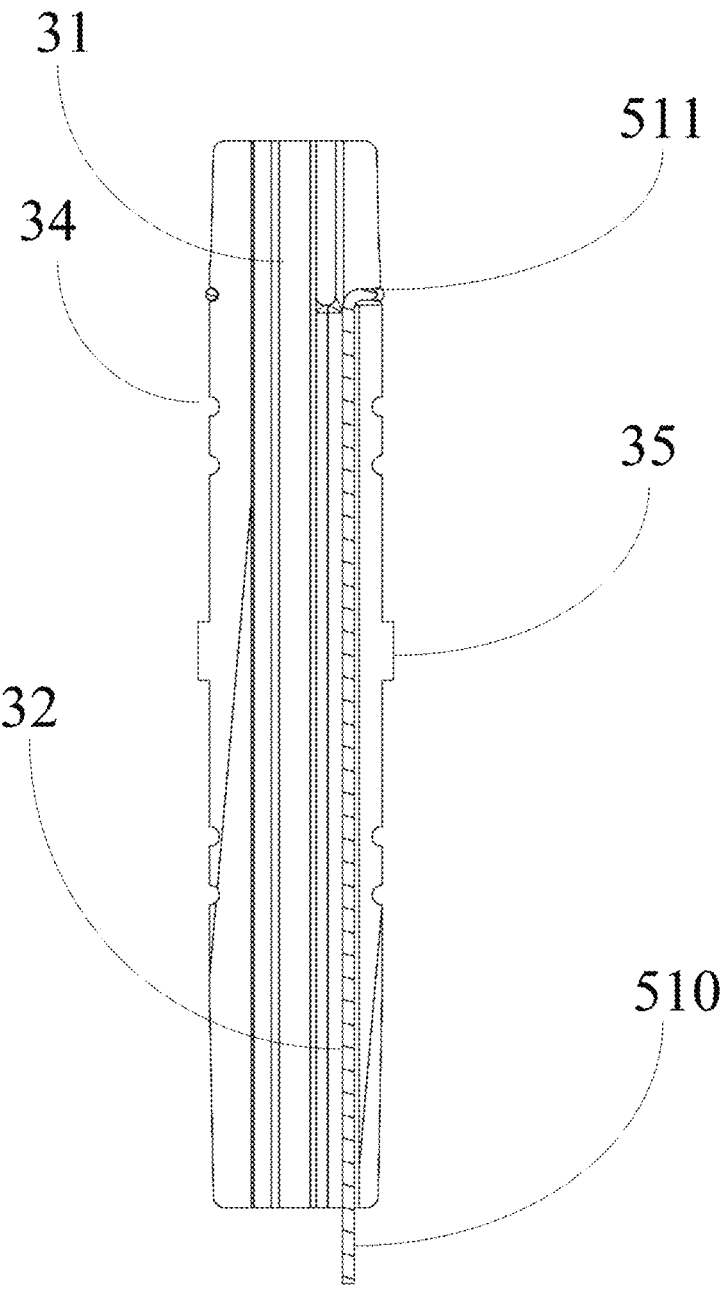
FIG. 3 shows an assembled sectional view of the perspective view of the intermediate electrical isolation portion and the first antenna of the temperature measurement device of the present disclosure.

As shown in FIGS. 2-3, the intermediate electrical isolation portion 3 can comprise: a first channel 31 and a second channel 32 penetrating through the intermediate electrical isolation portion 3; a first groove 33 provided around an outer wall of the intermediate electrical isolation portion 3, the first groove 33 being provided at a connection end between the intermediate electrical isolation portion 3 and the first metal portion 1; at least two second grooves 34 provided around the outer wall of the intermediate electrical isolation portion 3; an intermediate protrusion 35, when the first metal portion 1 and the second metal portion 2 are connected to the intermediate electrical isolation portion 3, the intermediate protrusion 35 separates or isolates the first metal portion 1 and the second metal portion 2, making them electrically insulated. A portion of the first antenna 51 is located within the second channel 32. The abutting body 511 is located within the first groove 33 and matches the first groove 33, in such a manner that a side of the abutting body 511 facing the inner wall of the first metal portion 1 protrudes from the first groove 33. This ensures that the abutting body 511 can tightly abut the first metal portion 1 even if deformation occurs at high temperatures, ensuring good antenna signal conduction function. The second grooves 34 are respectively provided at the connection end between the intermediate electrical isolation portion 3 and the first metal portion 1 and the connection end between the intermediate electrical isolation portion 3 and the second metal portion 2 and are used for filling sealing material.

When the first metal portion 1 and the second metal portion 2 are connected to the intermediate electrical isolation portion 3, the intermediate protrusion 35 serves as an indication line of the temperature measurement device. The portion from the indication line to the tip 20 is inserted into food, and the portion from the indication line to a handle is exposed to high-temperature air.

As shown in FIGS. 1 and 4, the circuit board unit 4 can comprise a circuit board fixing end 40, the circuit board fixing end 40 being accommodated within the first channel 31. The circuit board unit 4 comprises an elastic contact unit 41 contacting an inner wall of the second metal portion 2, the elastic contact unit 41 extends from the circuit board unit 4 to the second metal portion 2, the first metal portion 1 is connected to the circuit board unit 4 via the first antenna 51, and the first metal portion 1 and the second metal portion 2 are connected to the battery unit 6 via the first antenna 51 and the elastic contact unit 41, respectively.

In addition to the food temperature sensor 7, the temperature measurement device can further comprise an ambient temperature sensor 8, the ambient temperature sensor 8 extending from the circuit board unit 4 through the first channel 31 towards the first metal portion 1. The food temperature sensor 7 is close to an inner wall of the tip 20 of the housing, preferably in tight contact with the inner wall of the tip 20 of the housing.

In one embodiment, the temperature measurement device can further comprise a handle 9, the handle 9 being connected to the first metal portion 1. The handle 9 can be made of high-temperature resistant plastic, metal, or ceramic. Of course, the above is not limiting regarding the material of the handle 9. In one embodiment, the temperature measurement device may not comprise the handle 9, and an upper end of the first metal portion 1 can be held by the user.

When using the temperature measurement device, the second metal portion 2 and its tip 20 are inserted into food such as meat. Since the meat provides thermal insulation, the second metal portion 2 is in a low-temperature zone, while the first metal portion 1 is exposed to air and is in a high-temperature zone. A conventional circuit board unit 4 cannot withstand high temperatures. Placing the circuit board unit 4 inside the second metal portion 2 helps protect the circuit board unit 4 from high temperatures, but can affect antenna signal transmission. Therefore, to ensure good antenna signal, it is necessary to expose the antenna unit 5 outside the food. The first metal portion 1 and the first antenna 51 constitute the antenna unit 5, which facilitates the signal transmitted by the antenna unit 5 to be radiated radially outwards and minimizes signal loss.

The above description is only preferred embodiments of the present disclosure and is not intended to limit the present disclosure. Any modifications, equivalent replacements, improvements, etc., made within the spirit and principles of the present disclosure shall be included within the protection scope of the present disclosure.

What is claimed is:

1. A temperature measurement device, the temperature measurement device comprising:

a metal housing, the metal housing comprising a first metal portion and a second metal portion, the second metal portion having a tip for inserting into food;

an intermediate electrical isolation portion for connecting the first metal portion and the second metal portion, the intermediate electrical isolation portion being configured to electrically isolate the first metal portion and the second metal portion when they are connected to the intermediate electrical isolation portion; and a circuit board unit at least located within the second metal portion, the circuit board unit being connected to an antenna unit;

wherein the first metal portion and the second metal portion respectively serve as electrodes of the temperature measurement device, and the first metal portion serves as one part of the antenna unit of the temperature measurement device; the antenna unit comprises a first antenna extending from the circuit board unit towards the first metal portion and connected to the first metal portion, the first antenna and the first metal portion constituting the antenna unit; and the first antenna comprises an extension body and an abutting body, the extension body being connected to the circuit board unit, and the abutting body abutting against an inner wall of the first metal portion.

2. The temperature measurement device according to claim 1, wherein the abutting body comprises a first abutting portion, a second abutting portion connected to the first abutting portion, and a third abutting portion connected to the second abutting portion, which extend along and abut against the inner wall of the first metal portion, the first abutting portion is connected to the extension body, and an opening is provided between the third abutting portion and the extension body.

3. The temperature measurement device according to claim 2, wherein the intermediate electrical isolation portion comprises: a first channel and a second channel penetrating through the intermediate electrical isolation portion.

4. The temperature measurement device according to claim 3, wherein a portion of the extension body is located within the second channel.

5. The temperature measurement device according to claim 4, wherein the intermediate electrical isolation portion further comprises: a first groove provided along an outer wall of the intermediate electrical isolation portion, the abutting body being located within the first groove and matching the first groove, in such a manner that a side of the abutting body facing the inner wall of the first metal portion protrudes from the first groove.

6. The temperature measurement device according to claim 5, wherein the second abutting portion extends in an axial direction of the first metal portion at a distance away from the first abutting portion and the third abutting portion, the first abutting portion and the third abutting portion define an annular structure extending in a circumferential direction of the first metal portion, and the second abutting portion abuts the first metal portion in the axial direction of the first metal portion.

7. The temperature measurement device according to claim 5, wherein the circuit board unit comprises a circuit board fixing end, the circuit board fixing end being accommodated within the first channel.

8. The temperature measurement device according to claim 7, wherein the temperature measurement device further comprises an ambient temperature sensor, the ambient temperature sensor extending from the circuit board unit through the first channel towards the first metal portion.

9. The temperature measurement device according to claim 5, wherein the intermediate electrical isolation portion comprises: an intermediate protrusion, and when the first metal portion and the second metal portion are connected to the intermediate electrical isolation portion, the intermediate protrusion separates the first metal portion and the second metal portion.

10. The temperature measurement device according to claim 9, wherein when the first metal portion and the second metal portion are connected to the intermediate electrical isolation portion, and the intermediate protrusion serves as an indication line of the temperature measurement device.

11. The temperature measurement device according to claim 10, wherein the first groove is provided at a connection end between the intermediate electrical isolation portion and the first metal portion.

12. The temperature measurement device according to claim 11, wherein the temperature measurement device further comprises a battery unit connected to the circuit board unit, the circuit board unit comprises an elastic contact unit contacting an inner wall of the second metal portion, the elastic contact unit extends from the circuit board unit to the second metal portion, the first metal portion is connected to the circuit board unit via the first antenna, and the first metal portion and the second metal portion are connected to the battery unit via the first antenna and the elastic contact unit, respectively.

13. The temperature measurement device according to claim 11, wherein the intermediate electrical isolation portion further comprises at least two second grooves provided along the outer wall of the intermediate electrical isolation portion, the second grooves are respectively provided at the connection end between the intermediate electrical isolation portion and the first metal portion and a connection end between the intermediate electrical isolation portion and the second metal portion and are used for filling a sealing material.

\* \* \* \* \*